(12) United States Patent
Chen et al.

(10) Patent No.: US 8,188,695 B2
(45) Date of Patent: May 29, 2012

(54) MOTOR CONTROL DEVICE AND DRIVE DEVICE FOR HYBRID VEHICLE

(75) Inventors: Zhiqian Chen, Brighton (GB); Keisuke Nishimura, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 258 days.

(21) Appl. No.: 12/591,889

(22) Filed: Dec. 3, 2009

(65) Prior Publication Data
US 2010/0156333 A1  Jun. 24, 2010

(30) Foreign Application Priority Data

Dec. 24, 2008  (JP) .................................. 2008-327238

(51) Int. Cl.
*H02P 6/18* (2006.01)
(52) U.S. Cl. ................... 318/400.33; 318/721; 318/722; 318/714; 318/715
(58) Field of Classification Search ............. 318/400.33, 318/721, 722, 714, 715
See application file for complete search history.

(56) References Cited

U.S. PATENT DOCUMENTS

| | | | | |
|---|---|---|---|---|
| 6,118,237 | A  * | 9/2000 | Kikuchi et al. ............... | 318/139 |
| 6,573,675 | B2 * | 6/2003 | Schmitz et al. ............... | 318/434 |
| 6,674,261 | B2 * | 1/2004 | Takahashi et al. ............ | 318/721 |
| 7,122,979 | B2 * | 10/2006 | Wilton et al. ............ | 318/400.09 |
| 7,189,177 | B2 | 3/2007 | Takasu et al. | |
| 2008/0001571 | A1 | 1/2008 | Tomigashi | |

FOREIGN PATENT DOCUMENTS

| | | |
|---|---|---|
| JP | A 11-275884 | 10/1999 |
| JP | A 2002-39008 | 2/2002 |
| JP | A 2003-92802 | 3/2003 |
| JP | A 2005-105957 | 4/2005 |
| JP | A 2007-236015 | 9/2007 |
| JP | A 2008-11616 | 1/2008 |
| JP | A 2008-220100 | 9/2008 |

OTHER PUBLICATIONS

International Search Report mailed Feb. 23, 2010 for PCT/JP2009/069872.

* cited by examiner

*Primary Examiner* — Walter Benson
*Assistant Examiner* — David Luo
(74) *Attorney, Agent, or Firm* — Oliff & Berridge, PLC

(57) ABSTRACT

A hybrid drive device includes a first motor; an operative mechanism that drivingly connects the first motor to an engine of a vehicle; a second motor that is drivingly connected to a drive wheel; an engine rotation speed sensor that detects a rotation speed of the engine; a magnetic pole position sensor that detects a magnetic pole position of the second motor; a current sensor that detects a current flowing to the first motor; a sensorless motor control device that estimates a magnetic pole position of the first motor based on the current detected by the current sensor, and drivingly controls the first motor; and a second motor control device that drivingly controls the second motor based on the magnetic pole position detected by the magnetic pole position sensor.

7 Claims, 4 Drawing Sheets

F I G . 1
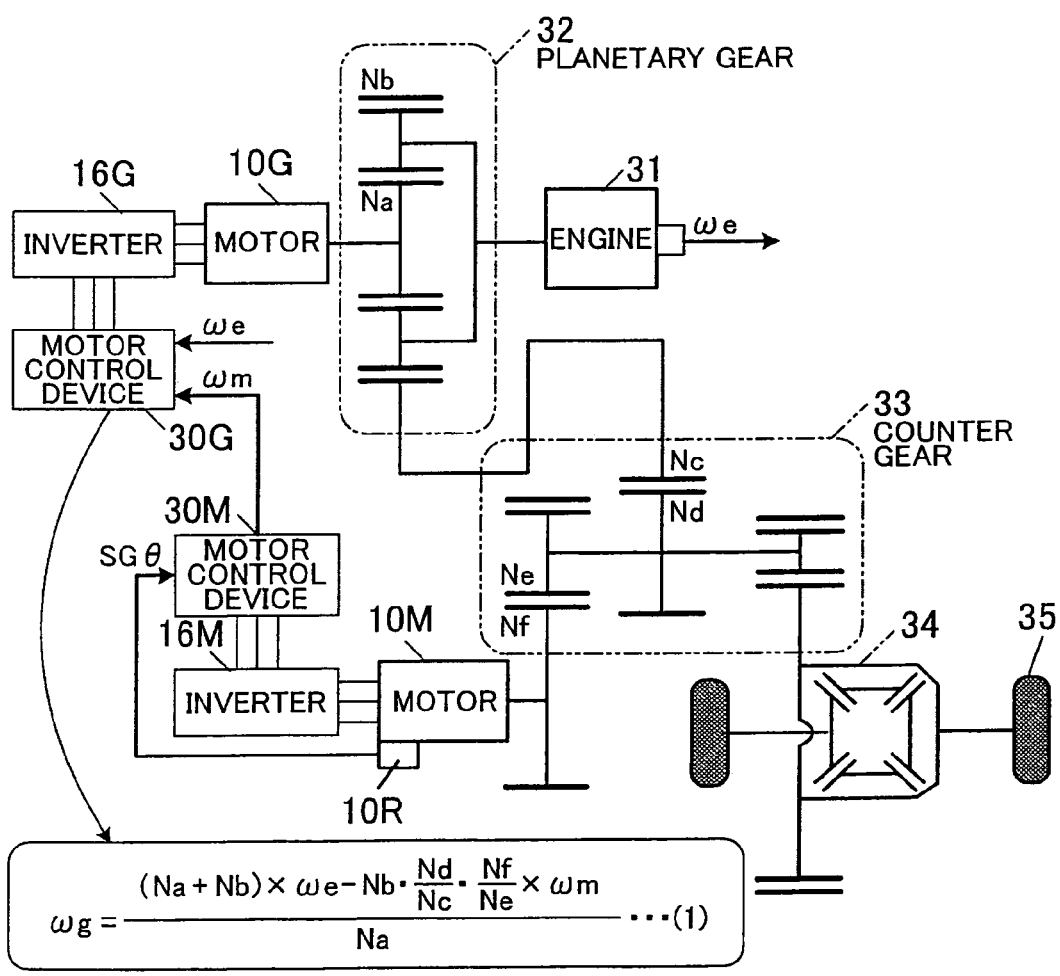
$$\omega g = \frac{(Na+Nb) \times \omega e - Nb \cdot \frac{Nd}{Nc} \cdot \frac{Nf}{Ne} \times \omega m}{Na} \quad \cdots (1)$$

MOTOR CONTROL DEVICE AND DRIVE DEVICE FOR HYBRID VEHICLE

CROSS-REFERENCE TO RELATED APPLICATION

The disclosure of Japanese Patent Application No. 2008-327238 filed on Dec. 24, 2008 including the specification, drawings and abstract is incorporated herein by reference in its entirety.

BACKGROUND

The present invention relates to a motor control device for a hybrid vehicle, and more specifically relates to a motor control device that uses a sensorless vector control to drivingly control one of a motor that is driven by an engine to generate power and a motor that drives a drive wheel. The motor control device of the present invention may be used in a drive device for a hybrid vehicle.

Japanese Patent Application Publication No. JP-A-H11-275884 describes the detection of a position angle of a synchronous motor without the use of a sensor, wherein a biaxial (d-axis, q-axis) current and voltage of a vector control are periodically sampled to calculate an induced voltage, and a position angle θ of a rotor is calculated based on the induced voltage, and the d-, q-axis currents and voltages. This sensorless position angle detection is a high-speed position angle computation that is employed when the synchronous motor is rotating at a speed that enables accurate calculation of the induced voltage. This computation cannot be used when the induced voltage is low and the motor stopped or running at a low speed, because either the position angle cannot be calculated or the calculation has a large margin of error. JP-A-H11-275884 further describes a drive device for a hybrid vehicle that is a combination of an engine, a drive wheel, a first motor, a second motor, and a power train that connects the first motor to the engine and connects the second motor and the engine to the drive wheel.

A drive device for a hybrid vehicle is also described in Japanese Patent Application Publication Nos. JP-A-2002-39008 and JP-A-2005-105957. In order to calculate the position angle, a resolver that generates a position angle signal representing the position angle of the rotor is used; sensorless position angle detection is not performed.

In Japanese Patent Application Publication No. JP-A-2007-236015, an induced voltage of a motor is calculated based on a d-axis voltage command of a motor vector control, and d-axis and q-axis currents of the motor. A position computation then calculates a position angle θ based on the induced voltage, the d-axis voltage command, and the d-, q-axis currents. This is also a high-speed position angle computation.

In addition to the position angle calculation of a motor sensorless drive control based on a vector control, there is a position angle computation that uses a high frequency. This calculation focuses on either running (injecting) a high-frequency current into the motor, or on a harmonic component of a motor current. Orthogonal biaxial inductances Ld, Lq are then estimated based on the high-frequency current, or the harmonic current and voltage, and the position angle calculated using Ld and Lq as parameters. According to this method, even when the induced voltage is low and the motor stopped or running at low speed, there is an injected high-frequency current or a harmonic current that is generated by a PWM control applying a drive voltage. Therefore, the position angle computation can be performed with high computational accuracy. However, when transmitting a high torque (high current), magnetic saturation causes a large margin of error in the estimation of the inductances Ld, Lq. That is, the position angle computation has a large margin of error. Therefore, the position angle calculation focusing on two-axis inductance is a low-speed position angle computation that is employed when the motor is stopped or rotating at low speed.

Hence, an initial state determination was conventionally considered in which, when driving of the motor is started, the three phases are shorted and a predetermined time allowed to pass, after which the three-phase current is detected. If the three-phase current exceeds a threshold, the motor is determined to be clearly rotating and a high-speed position angle computation employed. If the three-phase current is equal to or below the threshold, the motor is determined to be stopped or have uncertain rotation and a low-speed position angle computation employed.

SUMMARY

However, because the three phases are shorted and a predetermined time allowed to pass for the initial state determination, the initial state determination takes time and creates a delay until starting up and driving of the motor. Furthermore, the three-phase short circuit applies a braking torque to the power train when the motor is rotating, which can generate shock in the power train.

The present invention increases the reliability of a sensorless vector control of a hybrid drive device, which is provided with an engine, a drive wheel, a first motor, a second motor, and a power train connected therebetween, by using the sensorless vector control to drive one of the motors. The present invention also shortens a time required for an initial state determination of the motor driven by sensorless vector control. The present invention further suppresses torque variations in the motor driven by sensorless vector control that are caused by the initial state determination.

(1) A hybrid drive device has a first motor, an operative mechanism that drivingly connects the first motor to an engine of a vehicle, and a second motor that is drivingly connected to a drive wheel. The hybrid drive device further includes: an engine rotation speed sensor that detects a rotation speed of the engine; a magnetic pole position sensor that detects a magnetic pole position of the second motor; a current sensor that detects a current flowing to the first motor; a sensorless motor control device that estimates a magnetic pole position of the first motor based on the current detected by the current sensor, and drivingly controls the first motor; and a second motor control device that drivingly controls the second motor based on the magnetic pole position detected by the magnetic pole position sensor.

A lower cost can be achieved because there is no need for a magnetic pole position sensor (such as a resolver) to detect a magnetic pole position of a first motor. However, a magnetic pole position sensor is used for a second motor that is directly and drivingly connected to a drive wheel. Therefore, torque output to the drive wheel can be controlled with high accuracy so that the driver does not experience discomfort.

(2) In the hybrid drive device according to (1) above, the sensorless motor control device includes: a high-speed estimation unit that estimates the magnetic pole position of the first motor based on the current detected by the current sensor and a low-speed estimation unit that overlays a high-frequency current on the first motor and estimates the magnetic pole position; a first motor rotation speed calculation unit that calculates a rotation speed of the second motor based on the magnetic pole position of the second motor detected by the magnetic pole sensor, and calculates a rotation speed of the first motor based on the rotation speed of the second motor and the engine rotation speed sensor; and a selection unit that selects one of the high-speed estimation unit and the low-speed estimation unit based on the rotation speed of the first motor calculated by the first motor rotation speed calculation unit, wherein the first motor is drivingly controlled based on the magnetic pole position estimated by one of the high-speed estimation unit and the low-speed estimation unit selected by the selection unit.

Accordingly, the rotation speed of the first motor is calculated based on the rotation speed of the engine and the rotation speed of the second motor. One of the high-speed estimation unit and the low-speed estimation unit is then selected to estimate the magnetic pole position of the first motor. Therefore, the time required for determining the initial state of the first motor can be shortened.

In a first embodiment according to (1) and (2) above, the motor control device that applies a sensorless vector control to the first motor has a low-speed position computation function and a high-speed position computation function that both calculate a position angle of a rotor of the first motor, and also has a position angle computation selection function. Based on a rotation speed of the engine, a rotation speed of the second motor, and a number of gears of a power train that concerns the connections with the engine, the first motor, and the second motor, the position angle computation selection function calculates a rotation speed of the first motor. If the rotation speed of the first motor is equal to or less than a set value, the position angle is calculated by the low-speed position computation function; if the rotation speed exceeds the set value, the position angle is calculated by the high-speed position computation function. The calculated position angle is then used as a position angle of the motor control device, which is referenced in a three-phase/two-axis conversion and a two-axis/three-phase conversion for the sensorless vector control. This embodiment is further described in (3) below.

(3) In the sensorless motor control device according to (2) above, the sensorless motor control device further includes: a vector control unit that controls the first motor by converting a three-phase current of the first motor into an orthogonal biaxial current, calculating a biaxial voltage command value for matching the orthogonal biaxial current to an orthogonal biaxial target current, and converting the biaxial voltage command value into a three-phase voltage command value; a current filter that extracts a high-frequency current from the orthogonal biaxial current; and a voltage filter that extracts a high-frequency voltage from the biaxial voltage command value, wherein the low-speed estimation unit calculates the magnetic pole position based on the high-frequency current extracted by the current filter and the high-frequency voltage extracted by the voltage filter.

In an embodiment described later, the following formula (1) is used to calculate a rotation speed cog of a first motor 10G.

[Formula 1]

$$\omega g = \frac{(Na + Nb) \times \omega e - Nb \cdot \frac{Nd}{Nc} \cdot \frac{Nf}{Ne} \times \omega m}{Na} \quad (1)$$

where,
Na to Nf: number of gear teeth (FIG. 2),
ωe: rotation speed of engine, and
ωm: rotation speed of second motor.

Accordingly, the rotation speed (ωg: formula (1)) of the first motor is calculated based on the rotation speed (ωe) of the engine, the rotation speed (ωm) of the second motor, and the number of gear teeth (Na to Nf) of the power train. Therefore, the first motor can be drivingly started up without significant delay and without a three-phase short-circuit of a predetermined time during the initial state determination. In addition, there is no torque shock caused by a conventional three-phase short-circuit.

(4) In the sensorless motor control device according to (3) above, the sensorless motor control device further includes: a current filter that extracts a high-frequency current from the current converted from a three-phase current into an orthogonal biaxial current; and a voltage filter that extracts a high-frequency voltage from the biaxial voltage command value, wherein the low-speed estimation unit calculates the position angle based on the high-frequency current extracted by the current filter and the high-frequency voltage extracted by the voltage filter.

(5) In the sensorless motor control device according to (3) or (4) above, the sensorless motor control device further includes: a speed computation unit that calculates the rotation speed of the first motor based on a position angle referenced in the three-phase/two-axis conversion and the two-axis/three-phase conversion, wherein when operating voltage is applied to the sensorless motor control device, one of the low-speed estimation unit and the high-speed estimation unit immediately calculates the position angle, and the selection function selects the position angle calculated by the low-speed estimation unit if the rotation speed calculated by the speed computation unit is equal to or less than a set value, and selects the position angle calculated by the high-speed estimation unit if the rotation speed calculated by the speed computation unit exceeds the set value, as the position angle to be referenced in the three-phase/two-axis conversion and the two-axis/three-phase conversion.

BRIEF DESCRIPTION OF THE DRAWINGS

FIG. 1 is a block diagram that shows the grouping of gears in a power train of a hybrid drive device installed with a first motor control device 30G, which is a sensorless motor control device according to a first embodiment of the present invention;

DETAILED DESCRIPTION OF EMBODIMENTS

Figure 2:
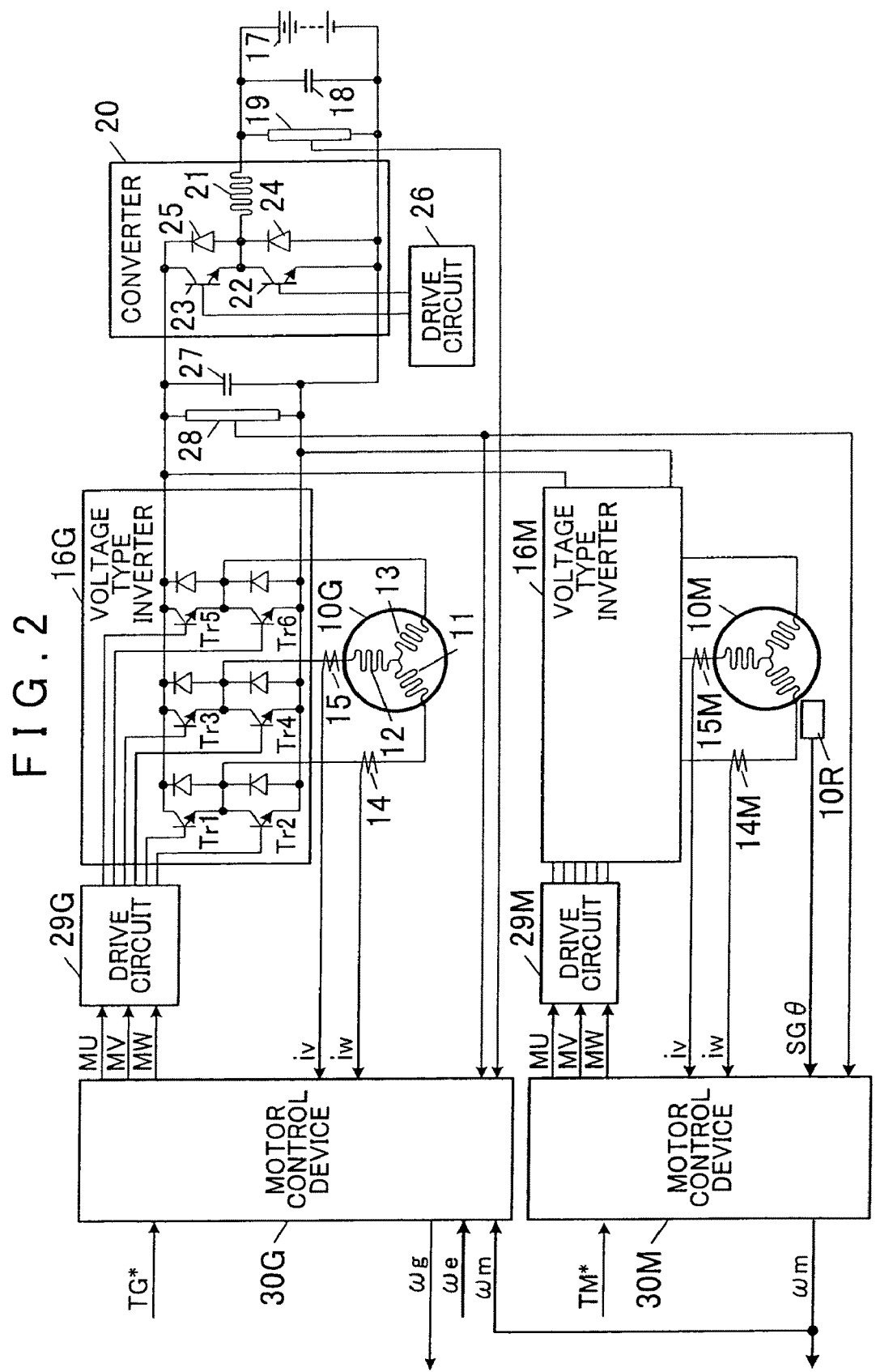
FIG. 2 is a block diagram that shows a drive system of first and second electric motors 10G, 10M shown in FIG. 1, and is also a block diagram that shows a functional configuration according to the first embodiment of a motor control device 30.

Other objects and characteristics of the present invention will become clear from the embodiments described below with reference to the accompanying drawings.

First Embodiment

FIG. 1 shows the grouping of gears in a power train of a hybrid drive device installed with a first motor control device 30G, which is a sensorless motor control device according to a first embodiment of the present invention. An engine 31 is connected to a pinion of a planetary gear mechanism 32, and Nb is a number of teeth of a ring gear that meshes with the pinion. A sun gear that meshes with the pinion is connected to a first electric motor 10G, which is a first motor. Na indicates the number of teeth of the sun gear. Nc is the number of teeth of a gear of a counter gear mechanism 33, which receives a reaction torque of the ring gear, and Nd is the number of teeth of a relay gear that meshes with this gear. A gear having an Nf number of teeth that meshes with a gear having an Ne number of teeth that is also coaxial with the relay gear is connected to a second electric motor 10M, which is a second motor. Another gear coaxial with the relay gear drives a differential gear 34 that is connected to a drive wheel 35.

Both the first electric motor 10G and the second electric motor 10M in the present embodiment are synchronous motors with embedded permanent magnets. The first electric motor 10G is driven through an inverter 16G by a sensorless vector control executed by the first motor control device 30G, which is a sensorless motor control device. The second electric motor 10M is driven through an inverter 16M by a second motor control device 30M, which is a motor control device that executes a vector control. Based on an electrical angle signal SGθ of a resolver 10R, the second motor control device 30M calculates a position angle θ and a rotation speed ωm, and uses both to execute a vector control computation.

The rotation speed ωm of the second electric motor 10M that was calculated by the second motor control device 30M based on the position angle signal SGθ of the resolver 10R and the rotation speed ωe of the engine 31 are sent to the first motor control device 30G. The first motor control device 30G then calculates a rotation speed ωg using formula (1).

FIG. 2 shows an outline of electrical connections between the electric motors, the inverters, the motor control devices, and a converter supplying power to the inverters, namely a motor drive system. In this embodiment, when starting the engine 31, the first electric motor 10G acting as a motor (stator) rotationally drives the engine 31. During rotation (operation) of the engine 31, the first electric motor 10G is rotationally driven by the engine 31 and used as a dynamotor to generate power. The second electric motor 10M is used as a motor to rotationally drive the drive wheel 35, and also used for dynamic braking. A battery 17 is an accumulator in the vehicle and connects to a primary-side condenser 18 when an electric component in the vehicle is turned on. Together with the battery 17, the primary-side condenser 18 forms a primary-side DC power supply. A voltage sensor 19 sends a voltage detection signal Vdc representing the voltage of the primary-side condenser 18 (voltage of the on-vehicle battery 17) to the motor control device 30. In this embodiment, partial pressure resistance is used in the voltage sensor 19. The positive electrode (+ line) of the primary-side DC power supply is connected to an end of a reactor 21 of a converter 20.

The converter 20 further includes a pressure-increasing semiconductor switch 22, which is a switching element for increasing pressure, that switches on and off between another end of the reactor 21 and the negative electrode (− line) of the primary-side DC power supply; a regenerative semiconductor switch 23, which is a switching element for regeneration, that switches on and off between the other end of the reactor 21 and the positive electrode of a secondary-side condenser 27; and diodes 24, 25 that are connected in parallel to the respective semiconductor switches 22, 23.

If the pressure-increasing semiconductor switch 22 is turned on (conductive), current flows from the primary-side DC power supply (17, 18) to the switch 22 through the reactor 21, and the reactor 21 accumulates power accordingly. If the switch 22 is turned off (non-conductive), the reactor 21 sends a high-pressure discharge to the secondary-side condenser 27 through the diode 25. In other words, a higher voltage than the voltage of the primary-side DC power supply is induced to charge the secondary-side condenser 27. Repeatedly turning the switch 22 on and off enables continued high-pressure charging of the secondary-side condenser 27. That is, the secondary-side condenser 27 is charged at a high voltage. Repeatedly switching between on and off in regular cycles increases the power accumulated by the reactor 21 depending on the length of the on period. Therefore, by adjusting the on time in a regular cycle (on-duty: ratio of the on time to the regular cycle), namely by performing a PWM control, the speed at which power is fed (feeding speed for power running) from the primary-side DC power supply 17, 18 to the secondary-side condenser 27 through the converter 20 can be adjusted.

If the regenerative semiconductor switch 23 is turned on (conductive), the accumulated power of the secondary-side condenser 27 is sent to the primary-side DC power supply 17, 18 through the switch 23 and the reactor 21 (reverse power supply: regeneration). In this case as well, by adjusting the on time of the switch 23 in a regular cycle, namely by performing a PWM control, the speed at which power is reverse-fed (feeding speed for regeneration) from the secondary-side condenser 27 to the primary-side DC power supply 17, 18 through the converter 20 can be adjusted.

The voltage type inverter 16 includes six switching transistors Tr1 to Tr6. The transistors Tr1 to Tr6 are driven on (conductive) based on six drive signals generated in parallel by a drive circuit 29. The DC voltage of the secondary-side condenser 27 (output voltage of the converter 20, i.e., secondary voltage) is converted into three AC voltages whose phase difference is $2\pi/3$, namely a three-phase AC voltage, and respectively applied to the three-phase (U-phase, V-phase, W-phase) stator coils 11 to 13 of the first electric motor 10G. Thus, phase currents iU, iV, iW respectively flow to the stator coils 11 to 13 of the first electric motor 10G, and rotate the rotor of the first electric motor 10G. In order to increase the power supply performance for driving on and off (switching) the transistors Tr1 to Tr6 using a PWM pulse and suppress voltage surges, the secondary-side output line of the converter 20, which is the input line of the inverter 16, is connected to the high-capacity secondary-side condenser 27. On the contrary, the primary-side condenser 18 forming the primary-side DC power supply is small, low-cost, and low-capacity. The capacity of the primary-side condenser 18 is considerably smaller than the capacity of the secondary-side condenser 27. The voltage sensor 28 detects a secondary voltage Vuc of the converter 20 and sends the detection result to the first motor control device 30G. The supply power line connected to the stator coils 11, 12 of the electric motor 10 is mounted with current sensors 14, 15 that use a hall IC. The current sensors 14, 15 respectively detect the phase currents iV, iW, and generate current detection signals (analog voltage) that are sent to the first motor control device 30G.

Figure 3:
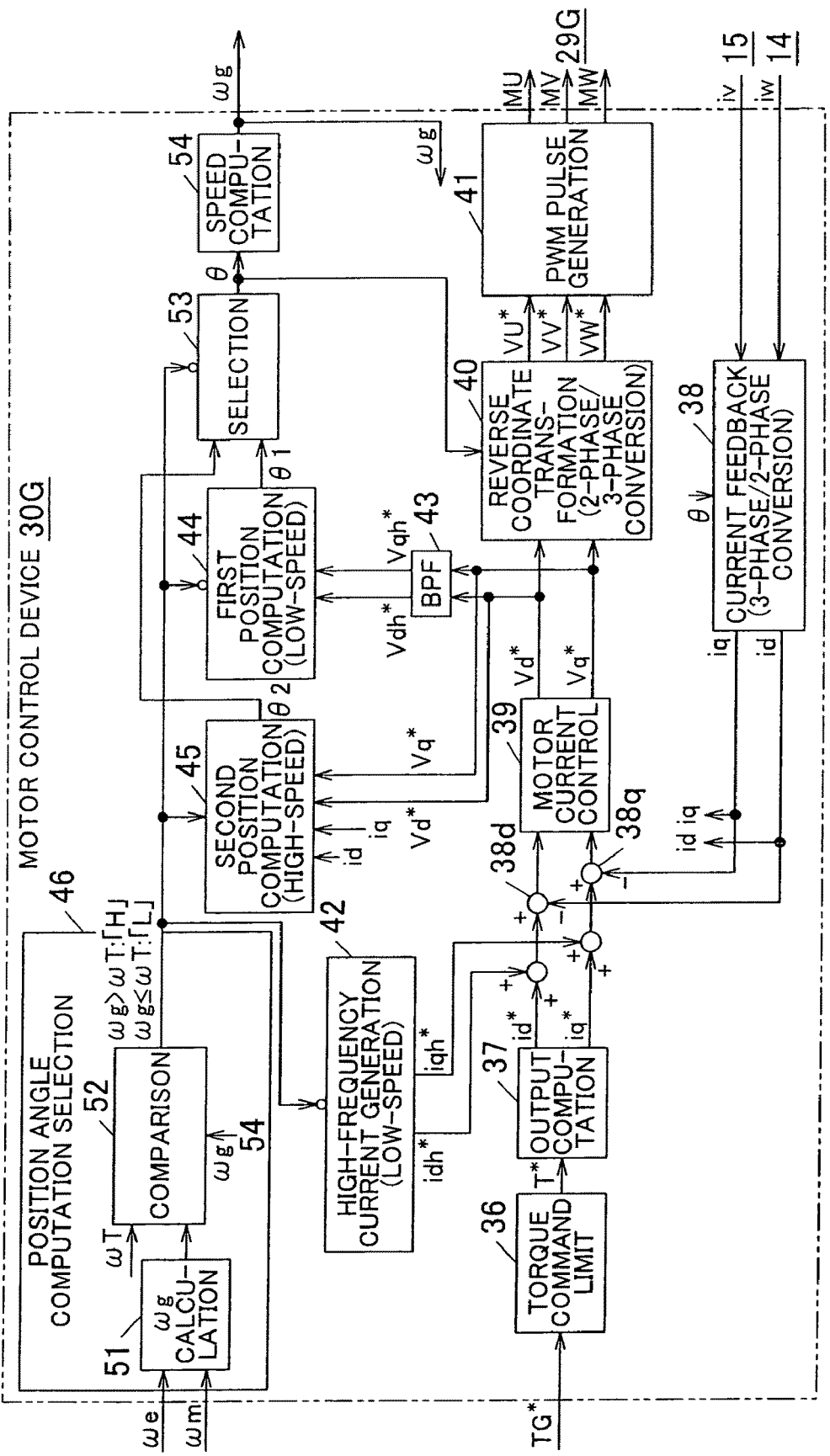
FIG. 3 is a block diagram that shows a sensorless vector control function of the first motor control device 30G shown in FIG. 2.

FIG. 3 shows a functional configuration of the first motor control device 30G. In the present embodiment, the first motor control device 30G is an electronic control unit whose main body consists of a digital signal processor (DSP). The motor control device 30 includes interfaces (signal processing circuits) not shown in the drawing between itself and the drive circuit 29G, the current sensors 14, 15, the primary voltage sensor 19, and the secondary voltage sensor 28, and further includes interfaces (communication circuits) not shown in the drawing between itself and a main controller of a vehicle running control system (not shown) in the vehicle.

Referring to FIG. 3, a first position computation unit 44, which is a low-speed computation unit, and a second position computation unit 45, which is a high-speed computation unit, calculate a rotation angle (position angle) θ of the rotor of the first electric motor 10G. A speed computation unit 54 calculates a rotation speed (angular speed) ωg based on the position angle θ. To be more precise, the position angle and magnetic pole position of the rotor of the first electric motor 10G are not the same; however, the two have a proportional relationship and the proportionality coefficient is determined by a magnetic pole number p of the electric motor 10. Furthermore, although the rotation angle and the angular speed are not the same, the two have a proportional relationship and the proportionality coefficient is determined by the magnetic pole number p of the first electric motor 10G. In the present specification, the position angle θ refers to the magnetic pole position. The rotation speed ω refers to the angular speed, and may also refer to the rotation speed.

The main controller of the vehicle running control system (not shown) sends a motor target torque TG* to the first motor control device 30G. Note that the main controller calculates a vehicle required torque TO* based on the vehicle speed and the throttle opening, generates first and second motor target torques TG*, TM* corresponding to the vehicle required torque TO*, and then respectively sends the first and second motor target torques TG*, TM* to the first and second motor control devices 30G, 30M. At engine start, the first motor target torque TG* is a high positive value in order for the first electric motor 10G to rotationally drive (start) the engine 31, and the second motor target torque TM* is a value (zero) that does not drive the drive wheel. When the engine is operating (rotating), the first motor target torque TG* is a negative value (power generation specification value) that specifies a required amount of power to generate, and the second motor target torque TM* is a required positive value for driving the drive wheel. The first motor control device 30G outputs a rotation speed ωg [rpm] of the first electric motor 10G to the main controller. The second motor control device 30M outputs a rotation speed ωm [rpm] of the second electric motor 10M to the main controller and the first motor control device 30G.

In accordance with a torque command limit 36, the first motor control device 30G reads out from a limit torque table (look-up table) a limit torque TG*max that corresponds to the rotation speed ωg and an upper limit Vmax of the output voltage (secondary voltage) of the converter 20. If the motor target torque TG* exceeds TG*max, TG*max is set as a target torque T*. If the motor target torque TG* is equal to or less than TG*max, the motor target torque TG* is set as the target torque T*. The motor target torque T* generated with such a limit added is sent to an output computation unit 37, and also used in a secondary target voltage calculation.

Note that the limit torque table is a memory region in which the upper limit Vmax of the secondary voltage and voltage values in the range of the rotation speed are written as addresses, and the maximum torque that can be loaded (imposed) on the first electric motor 10G at each voltage value is written as a limit torque TG*max. In the present embodiment, the limit torque table refers to a memory region of a RAM (not shown) in the first motor control device 30G. The limit torque TG*max becomes larger as the upper limit Vmax of the secondary voltage increases, and smaller as the upper limit Vmax decreases. In addition, the limit torque TG*max becomes larger as the rotation speed ωg decreases, and smaller as the rotation speed ωg increases.

There is a nonvolatile memory inside the first motor control device 30G that is written with the data TG*max of the limit torque table. When operating voltage is applied to the first motor control device 30G, the first motor control device 30G reads out. TG*max from the nonvolatile memory and writes TG*max to the RAM over the course of initializing itself and a motor drive system shown in FIG. 1. It will be noted later on that there are a plurality of other similar look-up tables in the first motor control device 30G. Like the limit torque table, these look-up tables also refer to memory regions on the RAM that are written with reference data in the nonvolatile memory.

The first motor control device 30G determines whether power running (motor operation) or regeneration (generator operation) is to be performed based on the target torque T* and the rotation speed ωg. The first motor control device 30G reads out a secondary target voltage Vuc* assigned for the rotation speed ωg of the first electric motor 10G from a secondary target voltage table assigned for the target torque T* in a "power running" group if power running, and in a "regeneration" group if regeneration. The first motor control device 30G then controls the converter 20 through the drive circuit 26 such that the secondary voltage detected by the sensor 28 matches the target voltage Vuc*.

The first motor control device 30G uses the output computation unit 37 and a motor current control 39 to execute a feedback control of the motor current, based on vector control computation on a conventional d-q axis model in which the d-axis is the direction of a pair of magnetic poles in the rotor of the first electric motor 10G and the q-axis is the direction perpendicular to the d-axis. The first motor control device 30G then calculates motor application voltages (target voltages) Vd*, Vq* to align the motor current values id, iq to target values id*, iq*. Based on a result of a two-phase/three-phase conversion unit 40 using the position angle θ, the first motor control device 30G subsequently converts the target voltages into three-phase target voltages VU*, VV*, VW*, generates inverter control signals (PWM pulses) MU, MV, MW for applying the target voltages to the first electric motor 10G, and outputs these to the drive circuit 29G.

To feed back the motor current, the first motor control device 30G digitally converts and reads the current detection signals iV, iW from the current sensors 14, 15. In a current feedback 38, the first motor control device 30G uses a three-phase/two-phase conversion, which is a conventional conversion of fixed coordinates into rotating coordinates that uses the position angle θ, to transform the three-phase current values iU, iV, iW of a fixed coordinate system into two-phase current values id, iq for the d-axis and q-axis of a rotating coordinate system. Note that iU+iV+iW=0, and iU is calculated based on this assumption.

A first high-efficiency torque curve table A, which is a look-up table, is used in the output computation unit 37. The first high-efficiency torque curve table A is written with d-axis current values id that are linked to the motor speed ωg and the motor target torque T*, and used to generate or load the target torques T* at each motor speed. The term "torque generation" is used for the motor operation, and "torque loading (application)" for the generator operation; however, in the present specification both are included in the concept of target torque generation.

The output torque (positive value: motor operation, negative value: generator operation) of the first electric motor 10G is set with respect to the values of the d-axis current id and the q-axis current iq. For one rotation speed, that is, at the same motor rotation speed, there are an infinite number of id, iq combinations for outputting the same torque, which are indicated on a constant torque curve. The id, iq combination with the highest efficiency of power use (least power consumption) on the constant torque curve is a high-efficiency torque point. A curve that connects the high-efficiency torque points on a plurality of torque curves is a high-efficiency torque curve that exists with respect to each rotation speed. The d-axis current id and the q-axis current iq for the position of the given motor target torque T* on the high-efficiency torque curve for the motor rotation speed are designated as target current values for biasing the first electric motor 10G. The first electric motor 10G thus outputs/inputs (receives) the target torque T* and such biasing of the motor results in a high power efficiency for motor/generator operation.

In the present embodiment, the high-efficiency torque curve is divided into two systems: the first high-efficiency torque curve A representing d-axis values, and a second high-efficiency torque curve B representing q-axis values. Furthermore, the first high-efficiency torque curve A is a pair of curves, with one applicable to the power running region and one applicable to the regeneration region; both represent the d-axis target current with respect to the motor rotation speed and the target torque.

The first high-efficiency torque curve table A is a memory region written with the target torque T* linked to the d-axis target currents in order to generate the target torque using the least power consumption, and is formed from a pair consisting of a power running table A1 for power running and a regeneration table A2 for regeneration. To determine which of the power running and regeneration tables is used, it is first determined whether power running (motor operation) or regeneration (generator operation) is to be performed based on the rotation speed ω of the electric motor and the given target torque T*, and one of the tables is selected based on the determination result.

In a d-axis current command calculation within the output computation unit 37, the first motor control device 30G subtracts a d-axis field weakening current Δid from the d-axis current value id, which is read out from the first high-efficiency torque curve table A corresponding to the target torque T* determined by the torque command limit 36. The first motor control device 30G then calculates a d-axis target current id* as id*=−id−Δid.

A q-axis current command calculation uses the second high-efficiency torque curve table B that is in the output computation unit 37. The second high-efficiency torque curve table B corrects the second high-efficiency torque curve B representing the q-axis values on the high-efficiency torque curve to a curve representing the q-axis target current after subtracting a q-axis field weakening current Δiq paired with the d-axis field weakening current Δid. The second high-efficiency torque curve table B then stores the data of the corrected second high-efficiency torque curve B. The second high-efficiency torque curve table B is a memory region written with the target torque T* and the d-axis field weakening current Δid linked to the d-axis target currents in order to generate the target torque using the least power consumption, that is, the target current values on a corrected second high-efficiency torque curve B. The second high-efficiency torque curve table B is also formed from a pair consisting of a power running table B1 for power running and a regeneration table B2 for regeneration. To determine which of the power running and regeneration tables is used, it is first determined whether power running or regeneration is to be performed based on the rotation speed ω of the electric motor and the target torque T*, and one of the tables is selected based on the determination result.

In the q-axis current command calculation, a q-axis target current iq* designated for the target torque T* and the d-axis field weakening current Δid is read from the second high-efficiency torque curve table B and set as the q-axis current command.

In the motor current control 39, the first motor control device 30G calculates a current difference δid between the d-axis target current id* and the d-axis current id, and a current difference δiq between the q-axis target current iq* and the q-axis current iq. A proportional control and integral control (PI computation of the feedback control) are performed based on the current differences δid, δiq. Based on such output, a d-axis voltage command value Vd* and a q-axis voltage command value Vq*, which are voltage target values for setting the current differences to zero, are then calculated.

Next in the two-phase/three-phase conversion unit 40, which performs a transformation of rotating coordinates into fixed coordinates, the target voltages Vd* and Vq* of a rotating coordinate system are transformed in accordance with the two-phase/three-phase conversion using the position angle θ into three-phase target voltages VU*, VV*, VW* of a fixed coordinate system, and applied to a PWM pulse generation unit 41. When the PWM pulse generation unit 41 receives the phase target voltages, the PWM pulse generator 48 converts them into PWM pulses MU, MV, MW in order to output voltage at each target voltage value, and outputs the PWM pulses MU, MV, MW to the drive circuit 29G shown in FIG. 2. The drive circuit 29G generates six drive signals in parallel based on the PWM pulses MU, MV, MW, and the drive signals respectively turn on and off the transistors Tr1 to Tr6 of the voltage type inverter 16. Thus, the phase target voltages are respectively applied and the phase currents iU, iV, iW flow to the stator coils 11 to 13 of the first electric motor 10G.

The rotation angle (magnetic pole position) θ of the rotor, that is, the position angle of the rotor, is calculated by the first position computation unit 44 that is the low-speed computation unit, or the second position computation unit 45 that is the high-speed computation unit. Following a selection made by a selection unit 53, the rotation angle θ is then applied to the two-phase/three-phase conversion unit 40 and a three-phase/two-phase conversion unit 38.

Harmonic voltage components Vdh*, Vqh* included in the motor voltage commands Vd*, Vq* of the first electric motor 10G are extracted by a band pass filter 43. The first position computation unit 44 that is the low-speed computation unit then calculates the position angle θ using a position angle computation that is based on the harmonic voltage components Vdh*, Vqh*. When the first position computation unit 44 calculates the position angle θ, a high-frequency current generation (for low speed) unit 42 is biased to generate harmonic current commands idh*, iqh, which are added to the d-, q-axis current commands id*, ih* generated by the output computation unit 37. Namely current commands for conducting high-frequency current to the first electric motor 10G are overlaid on the d-, q-axis current commands id*, ih*.

The second position computation unit 45 that is the high-speed computation unit calculates the position angle θ using a position angle computation that is based on the two-phase conversion value of the voltage, the three-phase current of the first electric motor 10G, and the induced voltage estimated from the three-phase current and the two-phase conversion value. The d-, q-axis current values id, iq converted from three phases to two phases by the three-phase/two-phase conversion unit 38 and the target voltages Vd*, Vq* calculated by the motor current control 39 are applied to the second position computation unit 45. The second position computation unit 45 samples the currents id, iq and the voltages Vd*, Vq* at a predetermined cycle, and uses them to calculate the induced voltage. The second position computation unit 45 then calculates the position angle using the induced voltage, the current id, iq, and the voltages Vd*, Vq*.

A position angle computation selection unit 46 serving as a selection unit determines whether the position angle θ is calculated using either the position computation unit 44 or the position computation unit 45. Generally speaking, the position angle computation selection unit 46 calculates the rotation speed ωg of the first electric motor 10G using formula (1) based on the rotation speed ωe of the engine 31 and the rotation speed ωm of the second electric motor 10M. The calculation is also based on the number of gear teeth Na to Nf (FIG. 1), which concern the connections with the first and second electric motor 10G, 10M, of the power train that is formed from the planetary gear mechanism 32 and the counter gear mechanism 33. If the rotation speed ωg is equal to or less than a set value ωT (if the motor is stopped or rotating at a low speed), the first position computation unit 44 is used to calculate the position angle θ; if ωg exceeds ωT (if the motor is rotating at a high speed), the second position computation unit 45 is used.

When the operation voltage is applied to the first motor control device 30G, a ωg calculation unit 51 of the position angle computation selection unit 46 calculates the rotation speed ωg using formula (1). A comparison unit 52 generates a speed determination signal specifying a low level L if the rotation speed ωg is equal to or less than the set value (threshold) ωT for high-, low-speed determination, and generates a speed determination signal specifying a high level H if the rotation speed ωg exceeds the threshold ωT. If the speed determination signal specifies L (low-speed), the first position computation unit 44 is selected, and the high-frequency current generation (low-speed) unit 42 starts generation of the harmonic current commands idh*, iqh. The second position computation unit 45 is not selected. Thus, the first position computation unit 44 calculates the position angle θ, and the selection unit 53 sends the position angle θ calculated by the first position computation unit 44 in accordance with the speed determination signal specifying L (low-speed) to the two-phase/three-phase conversion unit 40 and the three-phase/two-phase conversion unit 38.

If the speed determination signal specifies H (high-speed), the second position computation unit 45 is selected, and the high-frequency current generation (low-speed) unit 42 stops generation of the harmonic current commands idh*, iqh. The first position computation unit 44 is not selected. Thus, the second position computation unit 45 calculates the position angle θ, and the selection unit 53 sends the position angle θ calculated by the second position computation unit 45 in accordance with the speed determination signal specifying H (high-speed) to the two-phase/three-phase conversion unit 40 and the three-phase/two-phase conversion unit 38. In such case, according to the present embodiment, the rotation speed ωg of the first electric motor 10G thereafter is switched over to the rotation speed ωg generated by the speed computation unit 54 and sent to the comparison unit 52. The ωg calculation unit 51 does not perform a calculation. However, another embodiment is possible in which the ωg calculation unit 51 continues to calculate thereafter, and the rotation speed ωg calculated by the ωg calculation unit 51 is sent to the comparison unit 52.

As explained above, if the rotation speed ωg of the first electric motor 10G is equal to or less than the threshold ωT (if the motor is stopped or rotating at a low speed), the position angle computation selection unit 46 selects the first position computation unit 44 for low speed. Thus, the first position computation unit 44 calculates the position angle θ, which is then sent to the two-phase/three-phase conversion unit 40 and the three-phase/two-phase conversion unit 38. However, if the rotation speed ωg of the first electric motor 10G exceeds the threshold ωT (if the motor is rotating at a high speed), the position angle computation selection unit 46 selects the second position computation unit 45 for high speed. Thus, the second position computation unit 45 calculates the position angle θ, which is then sent to the two-phase/three-phase conversion unit 40 and the three-phase/two-phase conversion unit 38.

As explained above, the rotation speed ωg of the first electric motor 10G is calculated based on the rotation speed ωe of the engine 31, the rotation speed corn of the second electric motor 10M, and the number of gear teeth Na to Nf of the power train formed from the planetary gear mechanism 32 and the counter gear mechanism 33. Therefore, the first electric motor 10G can be drivingly started up without significant delay and without a conventional three-phase short-circuit of a predetermined time during an initial state determination. In addition, there is no torque shock caused by a conventional three-phase short-circuit. A comparatively highly reliable position angle can be obtained in all operation speed regions of the first electric motor 10G, and therefore, the vector control using this position angle has high reliability.

Referring back to FIG. 2, the main controller of the vehicle running control system (not shown) sends the motor target torque TM* to the second motor control device 30M, which executes a vector control for the second electric motor 10M. Note that the main controller calculates a vehicle required torque TO* based on the vehicle speed and the throttle opening, generates the motor target torque TM* corresponding to the vehicle required torque TO*, and then sends the motor target torque TM* to the second motor control device 30M. The second motor control device 30M outputs the rotation speed ωm [rpm] of the second electric motor 10M to the main controller and the first motor control device 30G.

The rotor of the second electric motor 10M is connected to the rotor of the resolver 10R that is used for detecting the position angle θ of the rotor. The resolver 10R generates the analog voltage (rotation angle signal) SGθ representing the rotor rotation angle of the resolver 10R, and sends the rotation angle signal SGθ to the second motor control device 30M.

Figure 4:
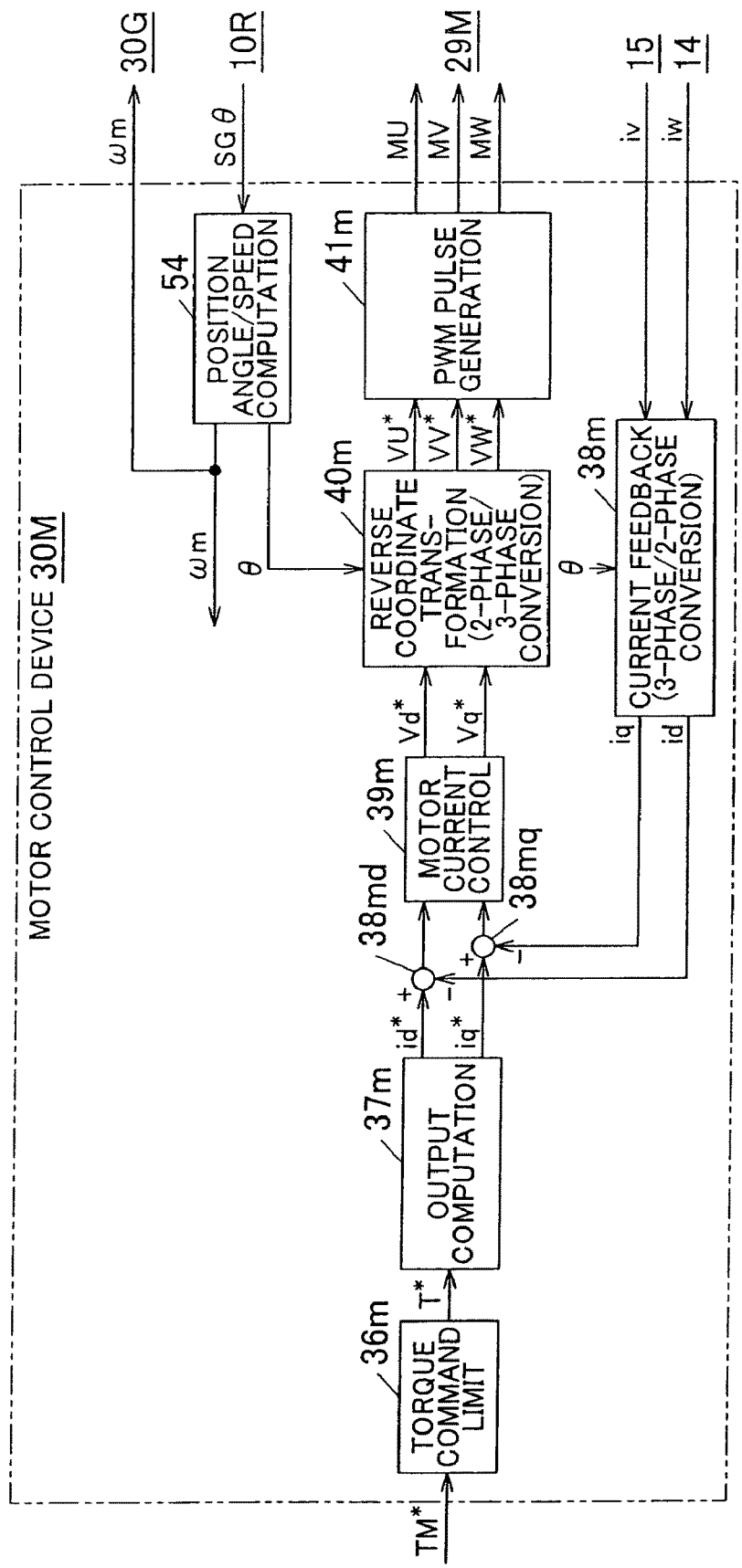
FIG. 4 is a block diagram that shows a vector control function of the second motor control device 30M shown in FIG. 2.

FIG. 4 shows a functional configuration of the second motor control device 30M. Compared to the functions of the first motor control device 30G (FIG. 3), the functions of the second motor control device 30M do not include the position angle computation selection unit 46, the first and second position computation units 44, 45, the selection unit 53, the speed computation unit 54, or the filters 42, 43. Instead, the second motor control device 30M has a position angle/speed computation unit 54. The position angle/speed computation unit 54 calculates the position angle θ and the rotation speed ωm of the second electric motor 10M based on the rotation angle signal SGθ from the resolver 10R, and sends the position angle θ to a two-phase/three-phase conversion unit 40m and a three-phase/two-phase conversion unit 38m.

The second motor control device 30M has a vector control function similar to the vector control function of the first motor control device 30G. Elements of the vector control function of the second motor control device 30M that are identical to elements of the vector control function of the first motor control device 30G are assigned with reference numerals that add an "m" to the reference numerals used for the first motor control device 30G. Aside from a different position angle calculation, the vector control algorithm of the second motor control device 30M is identical to that of the first motor control device 30G described above, and will not be explained here.

Note that in the embodiment described above, a sensorless vector control is applied to the first electric motor 10G. However, as another embodiment, a resolver may be added to the first electric motor 10G and the resolver 10R of the second electric motor 10M omitted, such that the first electric motor 10G is subject to a vector control performed by a motor control device equivalent to the second motor control device 30M, and the second electric motor 10M is subject to a sensorless vector control performed by a motor control device equivalent to the first motor control device 30G.

What is claimed is:

1. A hybrid drive device comprising:
a first motor;
a planetary gear mechanism that drivingly connects the first motor, an engine of a vehicle and a drive wheel of the vehicle;
a second motor that is drivingly connected to the drive wheel;
a magnetic pole position sensor that detects a magnetic pole position of the second motor;
a current sensor that detects a current flowing to the first motor;
a sensorless motor control device that estimates a magnetic pole position of the first motor based on the current detected by the current sensor, and drivingly controls the first motor based on the estimated magnetic pole position; and
a second motor control device that drivingly controls the second motor based on the magnetic pole position detected by the magnetic pole position sensor.

2. The hybrid drive device according to claim 1, wherein the planetary gear mechanism comprises a sun gear, a carrier that supports a pinion, and a ring gear,
the first motor is drivingly connected to the sun gear,
the engine is drivingly connected to the carrier, and
the drive wheel and the second motor are drivingly connected to the ring gear.

3. A hybrid drive device comprising:
a first motor;
an operative mechanism that drivingly connects the first motor to an engine of a vehicle;
a second motor that is drivingly connected to a drive wheel;
a magnetic pole position sensor that detects a magnetic pole position of the second motor;
a current sensor that detects a current flowing to the first motor;
a sensorless motor control device that estimates a magnetic pole position of the first motor based on the current detected by the current sensor, and drivingly controls the first motor; and
a second motor control device that drivingly controls the second motor based on the magnetic pole position detected by the magnetic pole position sensor, wherein:
the sensorless motor control device comprises:
a high-speed estimation unit that estimates the magnetic pole position of the first motor based on the current detected by the current sensor, and a low-speed estimation unit that overlays a high-frequency current on the first motor and estimates the magnetic pole position;
a first motor rotation speed calculation unit that calculates a rotation speed of the second motor based on the magnetic pole position of the second motor detected by the magnetic pole sensor, and calculates a rotation speed of the first motor based on the rotation speed of the second motor and the engine rotation speed sensor; and
a selection unit that selects one of the high-speed estimation unit and the low-speed estimation unit based on the rotation speed of the first motor calculated by the first motor rotation speed calculation unit, and
the first motor is drivingly controlled based on the magnetic pole position estimated by one of the high-speed estimation unit and the low-speed estimation unit selected by the selection unit.

4. The hybrid drive device according to claim 3, wherein the sensorless motor control device further comprises:
a vector control unit that controls the first motor by converting a three-phase current of the first motor into an orthogonal biaxial current, calculating a biaxial voltage command value for matching the orthogonal biaxial current to an orthogonal biaxial target current, and converting the biaxial voltage command value into a three-phase voltage command value; and
a voltage filter that extracts a high-frequency voltage from the biaxial voltage command value, wherein
the low-speed estimation unit calculates the magnetic pole position based on the high-frequency voltage extracted by the voltage filter.

5. The hybrid drive device according to claim 4, wherein the high-speed estimation unit calculates the magnetic pole position based on the orthogonal biaxial current which covered the three-phase current into and the biaxial voltage command value before the voltage filter.

6. The hybrid drive device according to claim 5, wherein the sensorless motor control device further comprises:
a speed computation unit that calculates the rotation speed of the first motor based on a position angle referenced in the three-phase/two-axis conversion and the two-axis/three-phase conversion, wherein
when operating voltage is applied to the sensorless motor control device, one of the low-speed estimation unit and the high-speed estimation unit immediately calculates the position angle, and the selection unit selects the position angle calculated by the low-speed estimation unit if the rotation speed calculated by the speed computation unit is equal to or less than a set value, and selects the position angle calculated by the high-speed estimation unit if the rotation speed calculated by the speed computation unit exceeds the set value, as the position angle to be referenced in the three-phase/two-axis conversion and the two-axis/three-phase conversion.

7. The hybrid drive device according to claim 4, wherein the sensorless motor control device further comprises:
a speed computation unit that calculates the rotation speed of the first motor based on a position angle referenced in the three-phase/two-axis conversion and the two-axis/three-phase conversion, wherein
when operating voltage is applied to the sensorless motor control device, one of the low-speed estimation unit and the high-speed estimation unit immediately calculates the position angle, and the selection unit selects the position angle calculated by the low-speed estimation unit if the rotation speed calculated by the speed computation unit is equal to or less than a set value, and selects the position angle calculated by the high-speed estimation unit if the rotation speed calculated by the speed computation unit exceeds the set value, as the position angle to be referenced in the three-phase/two-axis conversion and the two-axis/three-phase conversion.

* * * * *